(12) United States Patent
Yamada (10) Patent No.: US 9,524,387 B2
(45) Date of Patent: Dec. 20, 2016

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Tetsuya Yamada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/495,836

(22) Filed: Sep. 24, 2014

(65) Prior Publication Data

US 2015/0106918 A1   Apr. 16, 2015

(30) Foreign Application Priority Data

Oct. 11, 2013   (JP) .................................. 2013-214139

(51) Int. Cl.
  *G06F 21/45*   (2013.01)
  *G06F 21/31*   (2013.01)

(52) U.S. Cl.
  CPC ............... *G06F 21/45* (2013.01); *G06F 21/31* (2013.01)

(58) Field of Classification Search
  CPC .................................. G06F 21/45; G06F 21/31
  See application file for complete search history.

(56) References Cited

U.S. PATENT DOCUMENTS

| | | | |
|---|---|---|---|
| 2002/0109770 A1* | 8/2002 | Terada | H04M 3/567 348/14.08 |
| 2004/0260953 A1* | 12/2004 | Jamieson | H04L 63/0815 726/6 |
| 2005/0135271 A1* | 6/2005 | Inoue | H04L 9/083 370/254 |
| 2009/0055903 A1* | 2/2009 | Inose | G06F 21/41 726/4 |
| 2009/0300743 A1* | 12/2009 | Ma | H04L 41/0213 726/6 |
| 2011/0173686 A1* | 7/2011 | Ueno | H04N 1/00204 726/6 |

OTHER PUBLICATIONS

U. Blumenthal, et al., "User-based Security Model (USM) for version 3 of the Simple Network Management Protocol (SNMPv3)", Dec. 2002.

* cited by examiner

*Primary Examiner* — Andrew Nalven
*Assistant Examiner* — Mary Li
(74) *Attorney, Agent, or Firm* — Fitzpatrick, Cella, Harper & Scinto (57) ABSTRACT

When user information to be registered for SNMP authentication is input, an information processing apparatus confirms whether or not user information for MFP authentication is already managed for a user to be registered who is indicated by the input user information. In the case where the user information for MFP authentication is not managed for the user to be registered, the information processing apparatus registers the input user information as user information for SNMP authentication. In the case where the user information for MFP authentication is managed for the user, the information processing apparatus registers information specific to SNMP authentication, i.e. information other than an authentication password, out of the input user information.

13 Claims, 9 Drawing Sheets

USER INFORMATION EDIT

| | | |
|---|---|---|
| USER NAME : | Administrator | 401 |
| MIB ACCESS RESTRICTION : | READ/WRITE | 402 |
| SECURITY SETTING : | AUTHENTICATION/ ENCRYPTION | 403 |
| AUTHENTICATION ALGORITHM : | MD5 | 404 |
| AUTHENTICATION PASSWORD : | | 405 |
| ENCRYPTION ALGORITHM : | AES | 406 |
| ENCRYPTION PASSWORD : | ****** | 407 |

[ PRESENCE CONFIRMATION ] 410  [ CANCEL ] 408  [ OK ] 409

USER INFORMATION EDIT

| | | |
|---|---|---|
| USER ID : | Ichiro | 501 |
| AUTHENTICATION PASSWORD : | ****** | 502 |
| DISPLAY NAME : | SUZUKI ICHIRO | 503 |
| E-MAIL ADDRESS : | ichiro@example.com | 504 |
| DEPARTMENT CODE : | 1111 | 505 |

506 [ CANCEL ]  [ OK ] 507

| USER NAME | AUTHENTI-CATION PASSWORD | MIB ACCESS RESTRICTION | SECURITY SETTING | AUTHENTICATION ALGORITHM | ENCRYPTION ALGORITHM | ENCRYPTION PASSWORD |
|---|---|---|---|---|---|---|
| honda | | READ/WRITE | AUTHENTICATION/ENCRYPTION | MD5 | AES | Hon |
| kagawa | | READ/WRITE | AUTHENTICATION/ENCRYPTION | MD5 | AES | Kag |
| yoshida | | READ | AUTHENTICATION/ENCRYPTION | MD5 | AES | Yos |
| uchida | uch | READ/WRITE | AUTHENTICATION/ENCRYPTION | MD5 | AES | Uch |

FIG. 12B

| USER NAME | AUTHENTI-CATION PASSWORD | DISPLAY NAME | E-MAIL ADDRESS | DEPARTMENT CODE |
|---|---|---|---|---|
| honda | Hon | HONDA | honda@example.com | 1111 |
| kagawa | Kaga | KAGAWA | kagawa@example.com | 1111 |
| yoshida | Yos | YOSHIDA | yoshida@example.com | 2222 |
| endo | End | ENDO | endo@example.com | 3333 |
| sakai | Saka | SAKAI | sakai@example.com | 3333 |

INFORMATION PROCESSING APPARATUS, CONTROL METHOD FOR INFORMATION PROCESSING APPARATUS, AND STORAGE MEDIUM

BACKGROUND OF THE INVENTION

Field of the Invention

The present invention relates to an information processing apparatus that supports a plurality of authentication schemes and is capable of user authentication by each authentication scheme, a control method for the information processing apparatus, and a storage medium.

Description of the Related Art

Multifunction peripherals (MFPs) having a plurality of types of functions such as an image reading function, a printing function, and a communication function are widely known. Many MFPs have a user authentication function for authenticating each user, to control whether or not the user is allowed to use each function. The user authentication function manages, as user information, not only information (a user name, a password, a contactless card ID, etc.) necessary for authentication but also user attributes such as a display name and an e-mail address of each user displayed on an operation panel. The user authentication function can be used not only in the case where the user operates the MFP via the operation panel but also in the case where the user remotely accesses the MFP from a PC or the like connected to the MFP via a network and uses the functions of the MFP.

Access to the MFP from a PC via a network is not limited to the above-mentioned case of remote access, but includes the case of accessing the MFP using the Simple Network Management Protocol (SNMP) for managing and controlling the MFP. Particularly in the case of using SNMP version 3 (SNMPv3) described in RFC 3414, "User-based Security Model (USM) for version 3 of the Simple Network Management Protocol (SNMPv3)", December 2002, user authentication information is added to each command transmitted from the PC to the MFP, enabling the MFP to authenticate the user who uses SNMPv3.

The MFP-specific user authentication function mentioned above is intended to authenticate the user when the user uses the functions of the MFP by any access method such as access via the operation panel or access via the network. On the other hand, the user authentication function available in SNMPv3 is protocol-dependent, and requires protocol-specific settings for an authentication algorithm, an encryption algorithm, and the like. Normally, user authentication information used by the MFP-specific user authentication function and user authentication information used by the user authentication function available in SNMPv3 are managed individually. The latter user authentication information is typically managed in a management information base (MIB).

In such a case where, in an MFP that supports a plurality of authentication schemes, authentication information (user information) for user authentication by each authentication scheme is managed individually, overlapping sets of user information corresponding to the same user are managed. This could complicate the management of user information. Besides, if the user has registered a different authentication password for each authentication scheme, the user needs to use an individual password for user authentication by each authentication scheme. This could reduce user-friendliness. It is desirable that, for example when the user specifies the MFP from an external PC using SNMPv3 and accesses the specified MFP, user information common to some extent can be used for user authentication according to SNMPv3 and user authentication specific to the MFP.

SUMMARY OF THE INVENTION

The present invention has been made in view of the problems stated above. The present invention provides a technique of, in an information processing apparatus such as an MFP that supports a plurality of authentication schemes, individually managing information used specifically for each authentication scheme while unifying the management of user information used in common for the plurality of authentication schemes.

According to one aspect of the present invention, there is provided an information processing apparatus comprising: a first authentication unit and a second authentication unit configured to respectively perform user authentication by a first authentication scheme and a second authentication scheme, and each individually manage user information registered for user authentication; an input unit configured to accept input of user information to be registered for user authentication by the first authentication scheme; a confirmation unit configured to, when the user information is input via the input unit, confirm whether or not user information for user authentication by the second authentication scheme is managed by the second authentication unit for a user indicated by the input user information; and a control unit configured to control the first authentication unit to register the user information input via the input unit in a case where the confirmation unit confirms that the user information for user authentication by the second authentication scheme is not managed, and register information specific to the first authentication scheme out of the user information input via the input unit in a case where the confirmation unit confirms that the user information for user authentication by the second authentication scheme is managed.

According to another aspect of the present invention, there is provided a control method for an information processing apparatus including a first authentication unit and a second authentication unit configured to respectively perform user authentication by a first authentication scheme and a second authentication scheme and each individually manage user information registered for user authentication, the control method comprising steps of: accepting input of user information to be registered for user authentication by the first authentication scheme; when the user information is input in the accepting step, confirming whether or not user information for user authentication by the second authentication scheme is managed by the second authentication unit for a user indicated by the input user information; and controlling the first authentication unit to register the user information input in the accepting step in a case of confirming in the confirming step that the user information for user authentication by the second authentication scheme is not managed, and register information specific to the first authentication scheme out of the user information input in the accepting step in a case of confirming in the confirming step that the user information for user authentication by the second authentication scheme is managed.

According to still another aspect of the present invention, there is provided a computer-readable storage medium storing a computer program for causing a computer to execute steps of a control method for an information processing apparatus including a first authentication unit and a second authentication unit configured to respectively perform user authentication by a first authentication scheme and a second authentication scheme and each individually manage user information registered for user authentication, the control method comprising steps of: accepting input of user information to be registered for user authentication by the first authentication scheme; when the user information is input in the accepting step, confirming whether or not user information for user authentication by the second authentication scheme is managed by the second authentication unit for a user indicated by the input user information; and controlling the first authentication unit to register the user information input in the accepting step in a case of confirming in the confirming step that the user information for user authentication by the second authentication scheme is not managed, and register information specific to the first authentication scheme out of the user information input in the accepting step in a case of confirming in the confirming step that the user information for user authentication by the second authentication scheme is managed.

The present invention enables, in an information processing apparatus such as an MFP that supports a plurality of authentication schemes, individual management of information used specifically for each authentication scheme while unifying the management of user information used in common for the plurality of authentication schemes.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Embodiment 1

The following describes Embodiment 1 of the present invention, with reference to FIGS. 1 to 7 and FIGS. 12A and 12B.

<System Structure>

Figure 1:
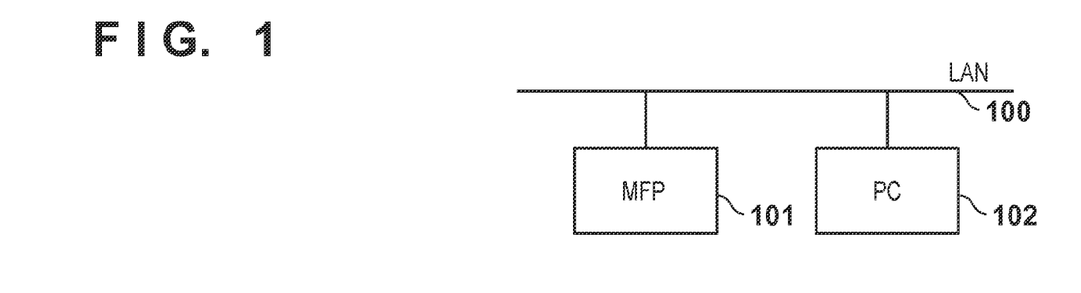
FIG. 1 is a diagram showing a system related to an MFP 101.

FIG. 1 is a block diagram showing a structural example of a system including an MFP 101. The MFP 101 is an example of an information processing apparatus according to the present invention. In the system shown in FIG. 1, the MFP 101 and a PC 102 are connected to a LAN 100, and are capable of communicating with each other via the LAN 100. Management software for managing the MFP 101 is installed in the PC 102. The PC 102 executes the installed management software, to access the MFP 101 using SNMP. The PC 102 thus obtains information from the MFP 101 or configures settings for the MFP 101.

The MFP 101 supports SNMP version 3 (SNMPv3) in this embodiment. SNMPv3 introduces a user authentication function, a data encryption function, and the like, as mentioned above. The PC 102 can use these functions, when accessing the MFP 101 using SNMPv3.

<Hardware Structure of MFP>

Figure 2:
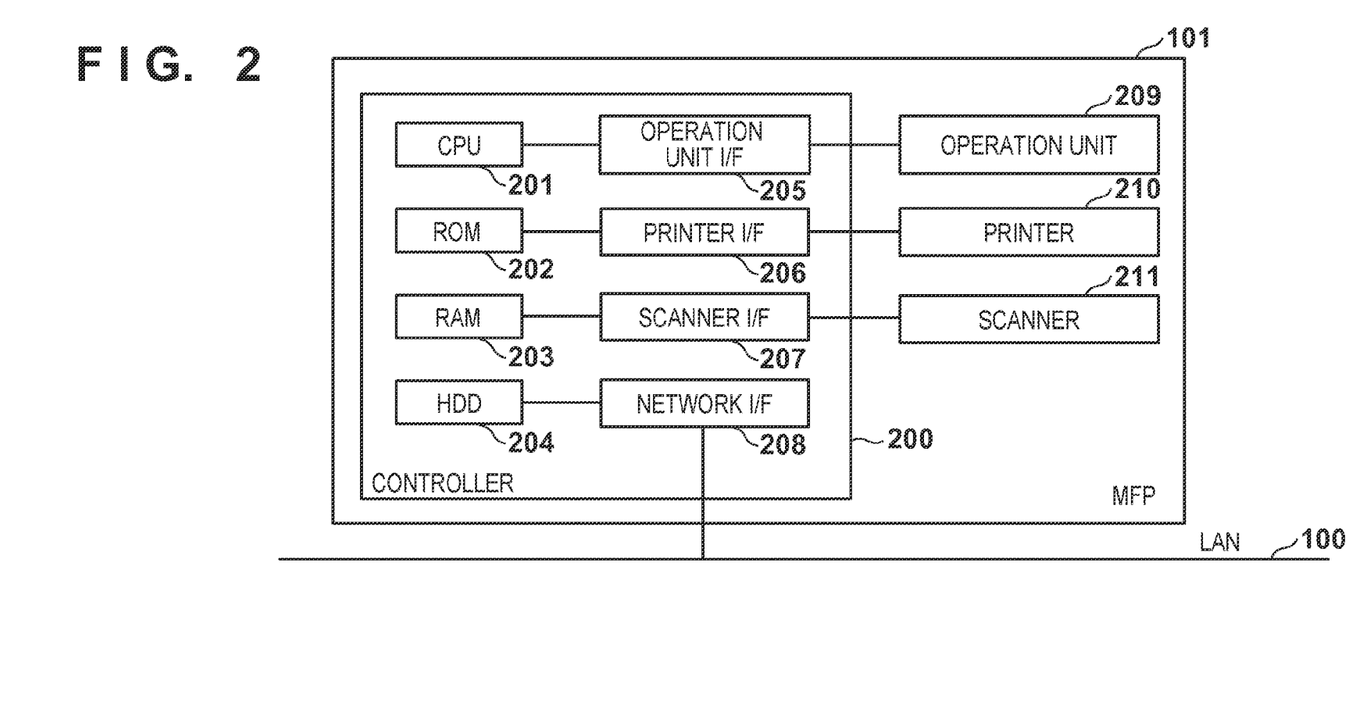
FIG. 2 is a block diagram showing a hardware structure of the MFP 101.

FIG. 2 is a block diagram showing an example of the hardware structure of the MFP 101. The MFP 101 includes devices such as a controller 200 that controls the overall operation of the MFP 101, an operation unit 209, a printer 210, and a scanner 211.

The controller 200 includes a CPU 201, a ROM 202, a RAM 203, an HDD 204, an operation unit interface (I/F) 205, a printer I/F 206, a scanner I/F 207, and a network I/F 208. The controller 200 controls the overall operation of the MFP 101 by these devices. The operation unit I/F 205, the printer I/F 206, and the scanner I/F 207 are connected respectively with the operation unit 209, the printer 210, and the scanner 211.

The CPU 201 performs various controls such as reading control and transmission control, by reading a control program stored in the ROM 202 into the RAM 203 and executing the control program. The RAM 203 is used as a temporary storage area for a main memory, a work area, or the like of the CPU 201. The HDD 204 stores image data, various programs, and so on.

The operation unit I/F 205 is an interface for connecting the operation unit 209 and the controller 200. The operation unit 209 includes a liquid crystal display unit having a touch panel function, a keyboard, and the like, and functions as a display device and an input device. The liquid crystal display unit functions as a display unit that displays various information. The operation unit 209 also functions as a user interface (UI) for a user to input various information and instructions to the MFP 101.

The printer I/F 206 is an interface for connecting the printer 210 and the controller 200. The CPU 201 transfers image data corresponding to an image to be printed on a recording medium by the printer 210, to the printer 210 via the printer I/F 206. The printer 210 prints the image based on the image data received from the controller 200, on the recording medium.

The scanner I/F 207 is an interface for connecting the scanner 211 and the controller 200. The scanner 211 reads an image on an original to generate image data, and transmits the generated image data to the controller 200 via the scanner I/F 207.

The network I/F 208 is an interface for connecting the controller 200 (the MFP 101) to the LAN 100. The network I/F 208 communicates with an external apparatus such as the PC 102 connected to the LAN 100, to transmit and receive various information (data) to and from the external apparatus.

<Software Structure of MFP>

Figure 3:
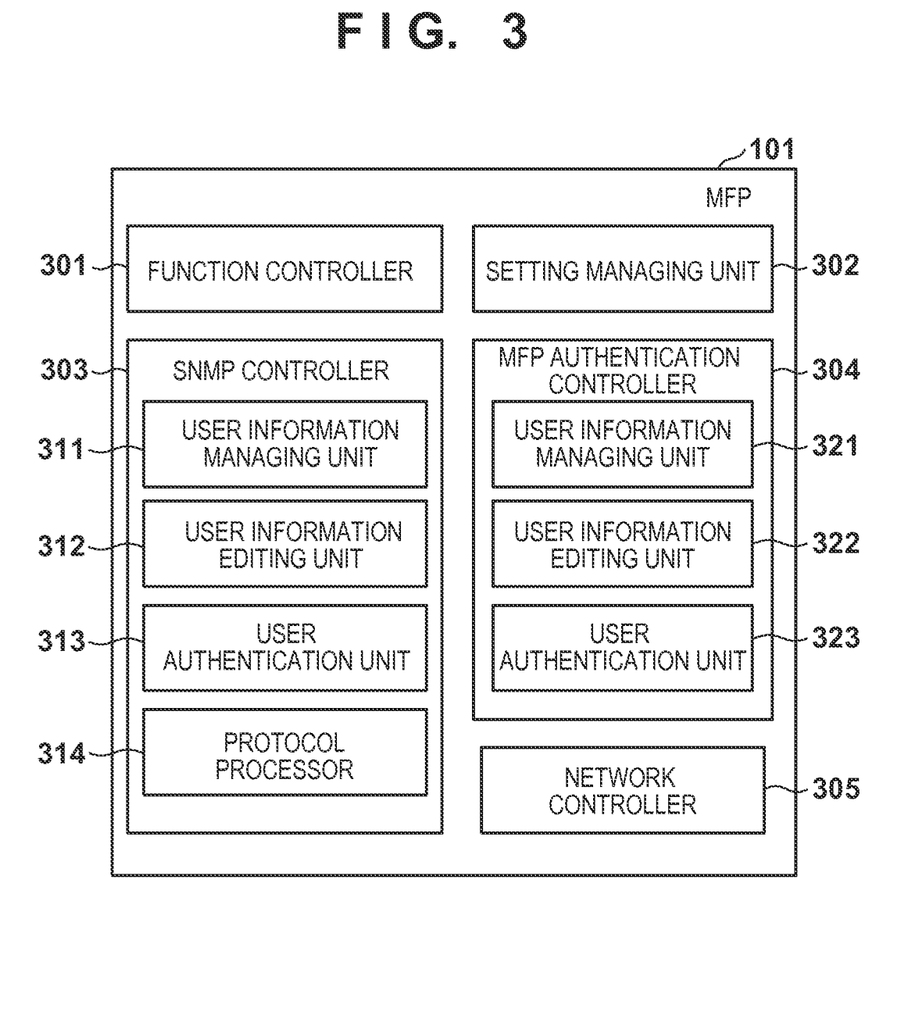
FIG. 3 is a block diagram showing a software structure of the MFP 101.

FIG. 3 is a block diagram showing an example of the software structure of the MFP 101. Software (control program) corresponding to each functional block shown in FIG. 3 is stored in the ROM 202 or the HDD 204 in the MFP 101. The below-mentioned function of each functional block shown in FIG. 3 is realized on the MFP 101, by the CPU 201 executing the software stored in the ROM 202 or the HDD 204. Alternatively, the function of each functional block may be realized by dedicated hardware. FIG. 3 shows the software structure particularly relevant to the description of this embodiment.

As shown in FIG. 3, the MFP 101 includes a function controller 301, a setting managing unit 302, an SNMP controller 303, an MFP authentication controller 304, and a network controller 305, as its software structure. The MFP 101 performs user authentication (hereafter also referred to as "MFP authentication") for authenticating a user who uses the functions of the MFP, by the MFP authentication controller 304. The MFP 101 also performs user authentication (hereafter also referred to as "SNMP authentication") according to SNMPv3 for authenticating a user who accesses the MFP 101 from an external apparatus such as the PC 102 using SNMPv3, by the SNMP controller 303.

The MFP 101 thus supports a plurality of authentication schemes including SNMP authentication (a first authentication scheme) and MFP authentication (a second authentication scheme). The SNMP controller 303 and the MFP authentication controller 304 perform user authentication respectively by SNMP authentication and MFP authentication and, as described later, individually manage user information registered for user authentication.

The function controller 301 controls the operation unit I/F 205, the printer I/F 206, and the scanner I/F 207, to perform operations corresponding to various functions such as copy, scan, and print of the MFP 101 and processes relating to user operations. The setting managing unit 302 manages set values necessary for operations corresponding to various functions of the MFP 101. The SNMP controller 303 controls processes according to SNMPv3, and transfers information (data) for managing set values with the setting managing unit 302. The MFP authentication controller 304 manages information of each user who is allowed to use the MFP, provides a UI for user authentication to the user, and provides information of the authenticated user to the function controller 301. The network controller 305 controls the network I/F 208.

(SNMP Controller 303)

The SNMP controller 303 includes a user information managing unit 311, a user information editing unit 312, a user authentication unit 313, and a protocol processor 314. A user of the MFP 101 can set the MFP 101 to operate using SNMPv3 when the MFP 101 is accessed from an external apparatus using SNMP. When the MFP 101 is accessed using SNMP, the SNMP controller 303 performs user authentication (SNMP authentication) according to SNMPv3.

The user information managing unit 311 manages user information registered for SNMP authentication, which is held in the MFP 101. The user information editing unit 312 provides a UI for the user to register and edit user information, to the user. The user information editing unit 312 provides such a UI by, for example, displaying an edit screen 400 shown in FIG. 4 in the operation unit 209. The user authentication unit 313 performs user authentication according to SNMPv3, based on information received from the external apparatus according to SNMPv3 and the user information managed by the user information managing unit 311. The protocol processor 314 performs processes according to SNMPv3. The protocol processor 314 manages, for example, set values necessary for the processes, according to SNMPv3.

Figure 4:
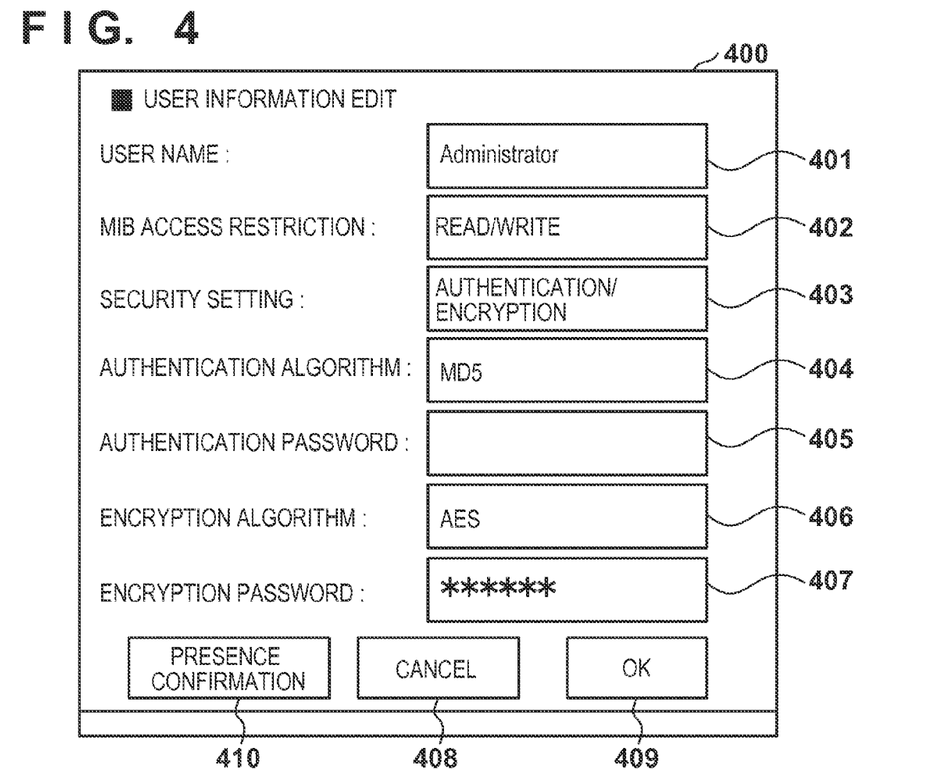
FIG. 4 is a diagram showing an example of a user edit screen of SNMPv3 which is a first authentication scheme according to Embodiment 1.

FIG. 4 is a diagram showing an example of an edit screen for editing user information, which is displayed in the operation unit 209 by the user information editing unit 312. The edit screen 400 shown in FIG. 4 includes input fields 401 to 407. The user can input or select a user name, an MIB access restriction, a security setting, an authentication algorithm, an authentication password, an encryption algorithm, and an encryption password, using the input fields 401 to 407. The user name and the authentication password input respectively in the input fields 401 and 405 are used for user authentication (SNMP authentication) according to SNMPv3 by the user authentication unit 313. The input fields 402, 403, 404, 406, and 407 are used to register information (settings) specific to SNMP authentication. The user information managing unit 311 registers and manages the information input in the input fields 401 to 407, as user information. The authentication password in this embodiment is an example of information other than information specific to SNMP authentication.

When the user presses a cancel button 408 on the edit screen 400, the user information editing unit 312 discards the information input on the edit screen 400, and closes the edit screen 400. Operations performed when the user presses an OK button 409 or a presence confirmation button 410 will be described later.

(MFP Authentication Controller 304)

The MFP authentication controller 304 includes a user information managing unit 321, a user information editing unit 322, and a user authentication unit 323. The user information managing unit 321 manages user information registered for user authentication for authenticating the user who uses the MFP 101. The user information editing unit 322 provides a UI for the user to register and edit user information, to the user. The user authentication unit 323 performs user authentication (MFP authentication) for authenticating the user who uses the MFP 101, based on the user information managed by the user information managing unit 321.

Figure 5:
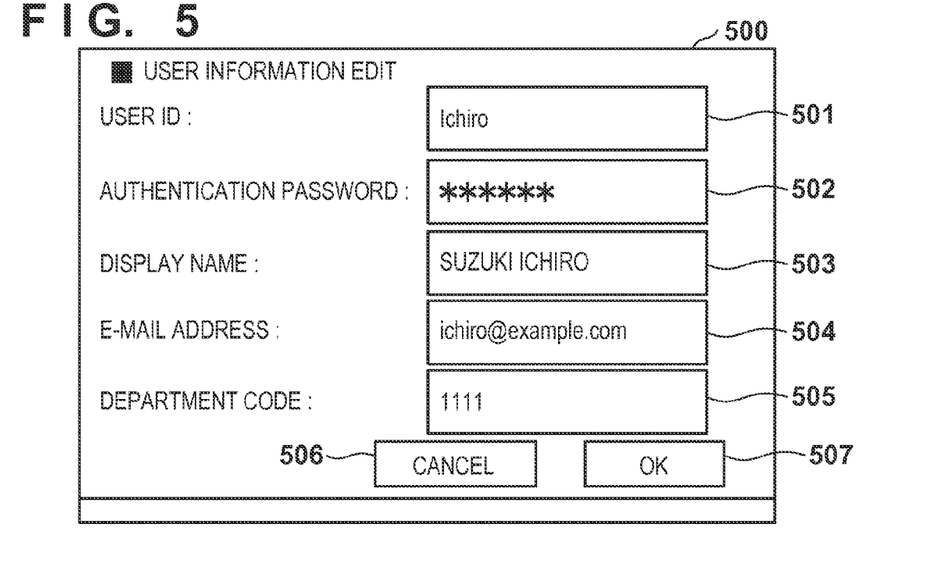
FIG. 5 is a diagram showing an example of a user edit screen of a user authentication function which is a second authentication scheme.

FIG. 5 is a diagram showing an example of an edit screen for editing user information, which is displayed in the operation unit 209 by the user information editing unit 322. An edit screen 500 shown in FIG. 5 includes input fields 501 to 505. The user can input a user name, an authentication password, a display name, an e-mail address, and a department code, using the input fields 501 to 505. The user name and the authentication password input respectively in the input fields 501 and 502 are used for user authentication by the user authentication unit 323. The information input in the input fields 503 to 505 are used for display, operation, accounting management, and the like by the function controller 301. The user information managing unit 321 registers and manages the information input in the input fields 501 to 505, as user information.

When the user presses a cancel button 506 on the edit screen 500, the user information editing unit 322 discards the information input on the edit screen 500, and closes the edit screen 500. When the user presses an OK button 507, the user information editing unit 322 stores the input information through the user information managing unit 321, and closes the edit screen 500. It should be noted that the information (data) managed by the setting managing unit 302 and the user information managing units 311 and 321 are actually managed in a state of being stored in the RAM 203 or the HDD 204.

In this embodiment, when the SNMP controller 303 accepts input of user information to be registered for SNMP authentication via the edit screen 400, the SNMP controller 303 confirms whether or not user information for MFP authentication is already managed for a user indicated by the input user information. In the case where the user information for MFP authentication is not managed for the user, the SNMP controller 303 registers the input user information as user information for SNMP authentication. On the other hand, in the case where the user information for MFP authentication is managed for the user, the SNMP controller 303 registers information specific to SNMP authentication out of the input user information. This enables, when user information for SNMP authentication and user information for MFP authentication are managed in the MFP 101, individual management of information used specifically for each authentication scheme while unifying user information (for example, an authentication password) used in common for these authentication schemes.

(Management Example of User Information)

Figure 12A:
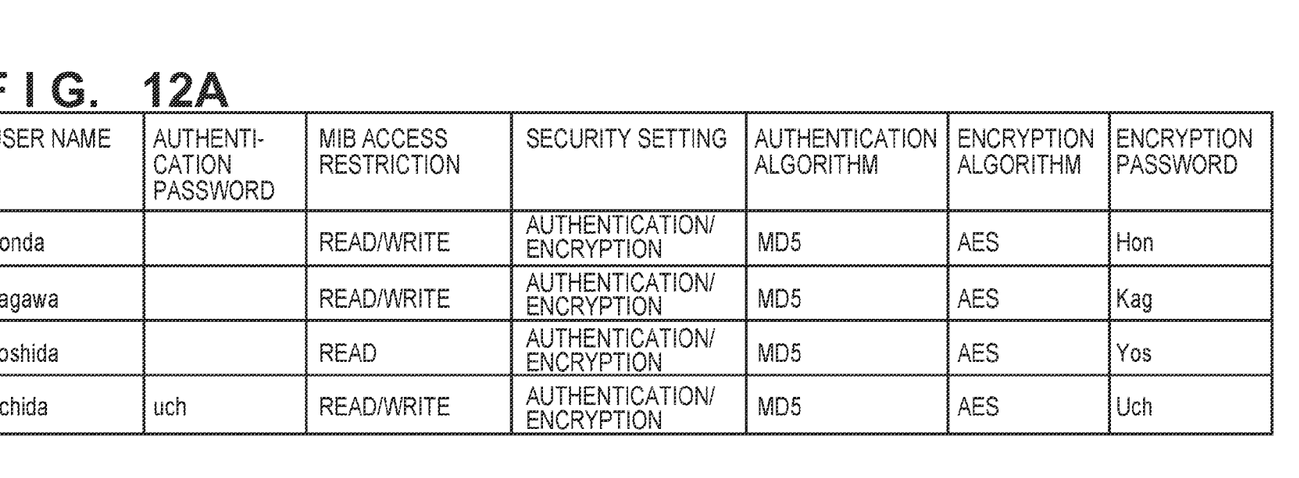
FIG. 12A is a diagram showing an example of user management in a user information managing unit 311.
Figure 12B:
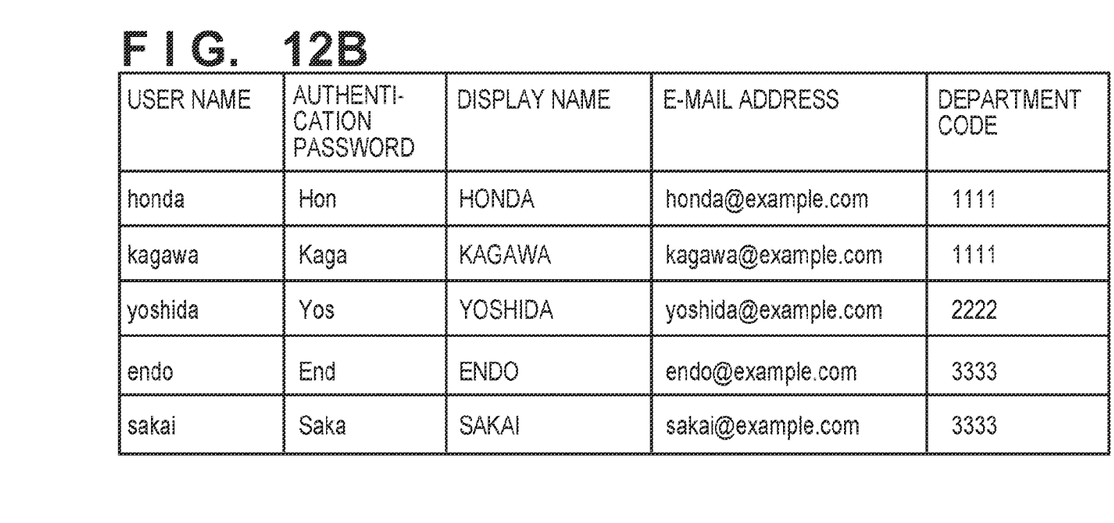
FIG. 12B is a diagram showing an example of user management in a user information managing unit 321 for MFP authentication.

FIGS. 12A and 12B are diagrams showing an example of user information managed by the user information managing unit 311 for SNMP authentication and the user information managing unit 321 for MFP authentication, respectively. The user information shown in FIGS. 12A and 12B are registered and edited using the edit screen 400 shown in FIG. 4 and the edit screen 500 shown in FIG. 5, respectively.

For users whose user names are "honda", "kagawa", and "yoshida", no authentication password is managed by the user information managing unit 311, as shown in FIG. 12A. This is because the user information of these users are managed by the user information managing unit 321 for MFP, as shown in FIG. 12B. The user information managing unit 311 manages no authentication password for each user whose user information is managed by the user information managing unit 321.

On the other hand, for a user whose user name is "uchida", an authentication password is managed by the user information managing unit 311, as shown in FIG. 12A. This is because the user information of the user is not managed by the user information managing unit 321 for MFP, as shown in FIG. 12B. The user information managing unit 311 manages an authentication password only for each user whose user information is not managed by the user information managing unit 321.

Thus, in this embodiment, in the case where user information corresponding to the same user is registered in both the user information managing units 311 and 321, user information (authentication password) used in common for SNMP authentication and MFP authentication is managed in the user information managing unit 321. This enables unified management of user information (authentication password) used in common for both authentication schemes, so that the user can use the common user information (authentication password) upon user authentication by both the authentication schemes.

<Process of Registering User Information For SNMP Authentication>

Figure 6:
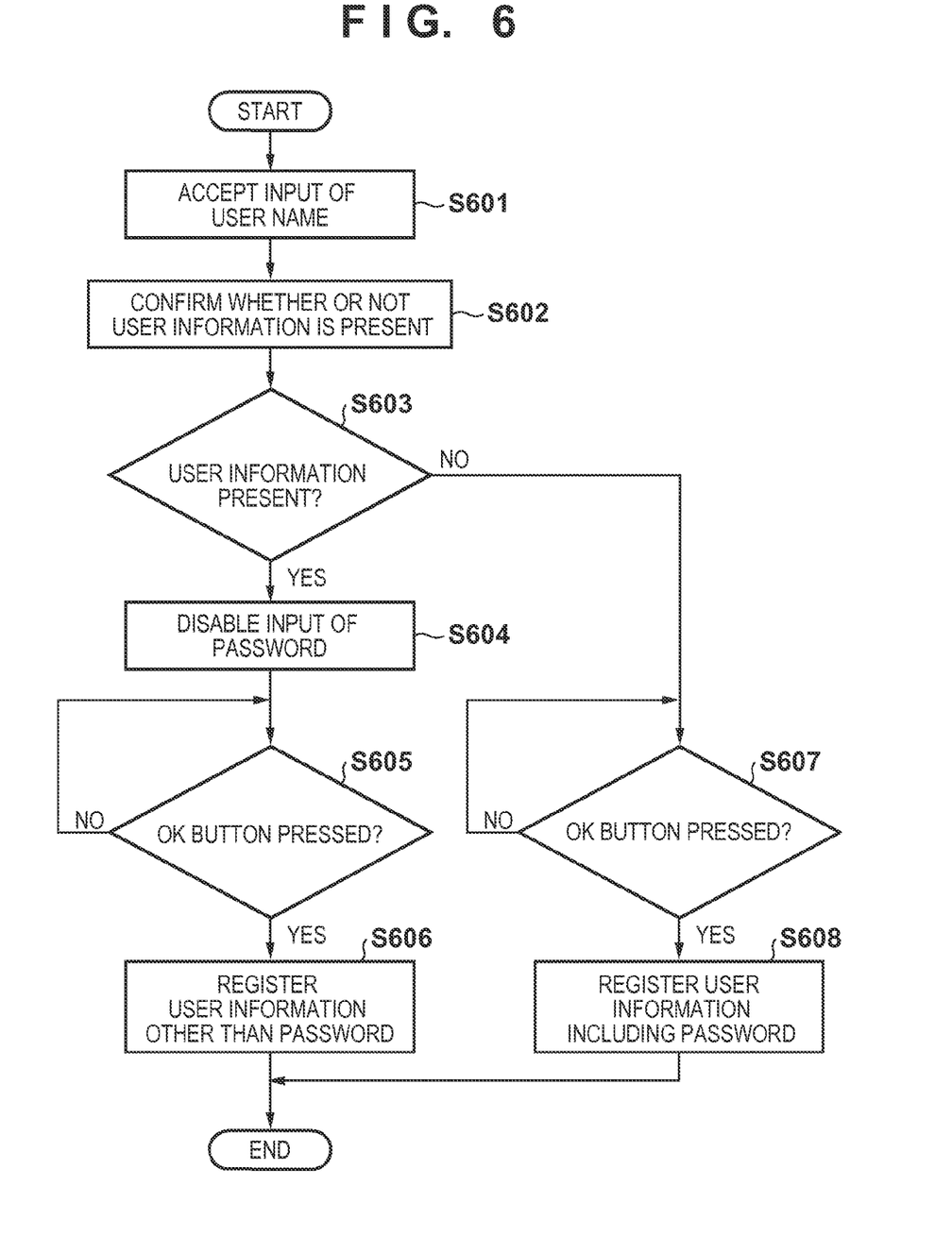
FIG. 6 is a flowchart showing user registration of SNMPv3 according to Embodiment 1.

FIG. 6 is a flowchart showing a process of registering user information for SNMP authentication in the MFP 101 according to this embodiment. The process of each step shown in FIG. 6 is realized in the MFP 101, by the CPU 201 reading software (software corresponding to each functional block shown in FIG. 3) stored in the ROM 202 or the HDD 204 into the RAM 203 and executing the software. The process of each step is thus executed by the CPU 201.

In S601, the user information editing unit 312 (the CPU 201) accepts input of a user name of a user to be registered, in the input field 401 on the edit screen 400. Following this, in S602, when the operation unit 209 detects that the user has pressed the presence confirmation button 410 on the edit screen 400, the user information editing unit 312 confirms whether or not user information corresponding to the input user name is present. In other words, the user information editing unit 312 confirms whether or not user information for MFP authentication is managed by the user information managing unit 321 for the user to be registered.

In detail, the user information editing unit 312 inquires of the user information managing unit 321 whether or not information indicating the same user name as the input user name is included in the user information managed by the user information managing unit 321 for MFP authentication. The user information editing unit 312 may automatically confirm whether or not the user information is present in S602 in response to the input of the user name in S601, instead of in response to the press of the presence confirmation button 410.

In the case where the user information editing unit 312 confirms that the information indicating the same user name is present in S603 as a result of the inquiry, the user information editing unit 312 determines not to manage the authentication password of the user to be registered by the user information managing unit 311 for SNMP authentication. In this case, the user information editing unit 312 advances the process to S604, and controls the operation unit 209 so that the user is not allowed to input information to the input field 405 for authentication password input. The operation unit 209 accordingly operates not to accept input of information (authentication password) other than information specific to SNMP authentication. For example, the operation unit 209 displays that user information corresponding to the same user name is already registered in the MFP 101, and disables input to the input field 405.

After this, when the operation unit 209 detects that the user has pressed the OK button 409 in S605 (S605: YES), the user information editing unit 312 advances the process to S606. In S606, the user information editing unit 312 registers user information input via the edit screen 400, in the user information managing unit 311 as user information for SNMP authentication. Here, the user information editing unit 312 registers information specific to SNMP authentication, that is, information other than an authentication password, as user information. The user information managing unit 311 manages the registered user information in a state of being stored in the RAM 203 or the HDD 204.

In the case where the user information editing unit 312 confirms that the information indicating the same user name is not present in S603, the user information editing unit 312 determines to manage the authentication password of the user to be registered by the user information managing unit 311 for SNMP authentication. In this case, the user information editing unit 312 advances the process to S607. When the operation unit 209 detects that the user has pressed the OK button 409 in S607 (S607: YES), the user information editing unit 312 advances the process to S608. In S608, the user information editing unit 312 registers all user information including an authentication password input via the edit screen 400, in the user information managing unit 311 as user information for SNMP authentication. The user information managing unit 311 manages the registered user information in a state of being stored in the RAM 203 or the HDD 204.

According to the process shown in FIG. 6, in the case where, when user information is registered or edited, user information of the user to be registered is already managed by the user information managing unit 321 for MFP authentication, the management of the user's authentication password can be unified in the user information managing unit 321. In the case where no user information of the user to be registered is managed by the user information managing unit 321 for MFP authentication, the user's authentication password can be separately managed by the user information managing unit 311 for SNMP authentication.

<SNMP Authentication Process>

Figure 7:
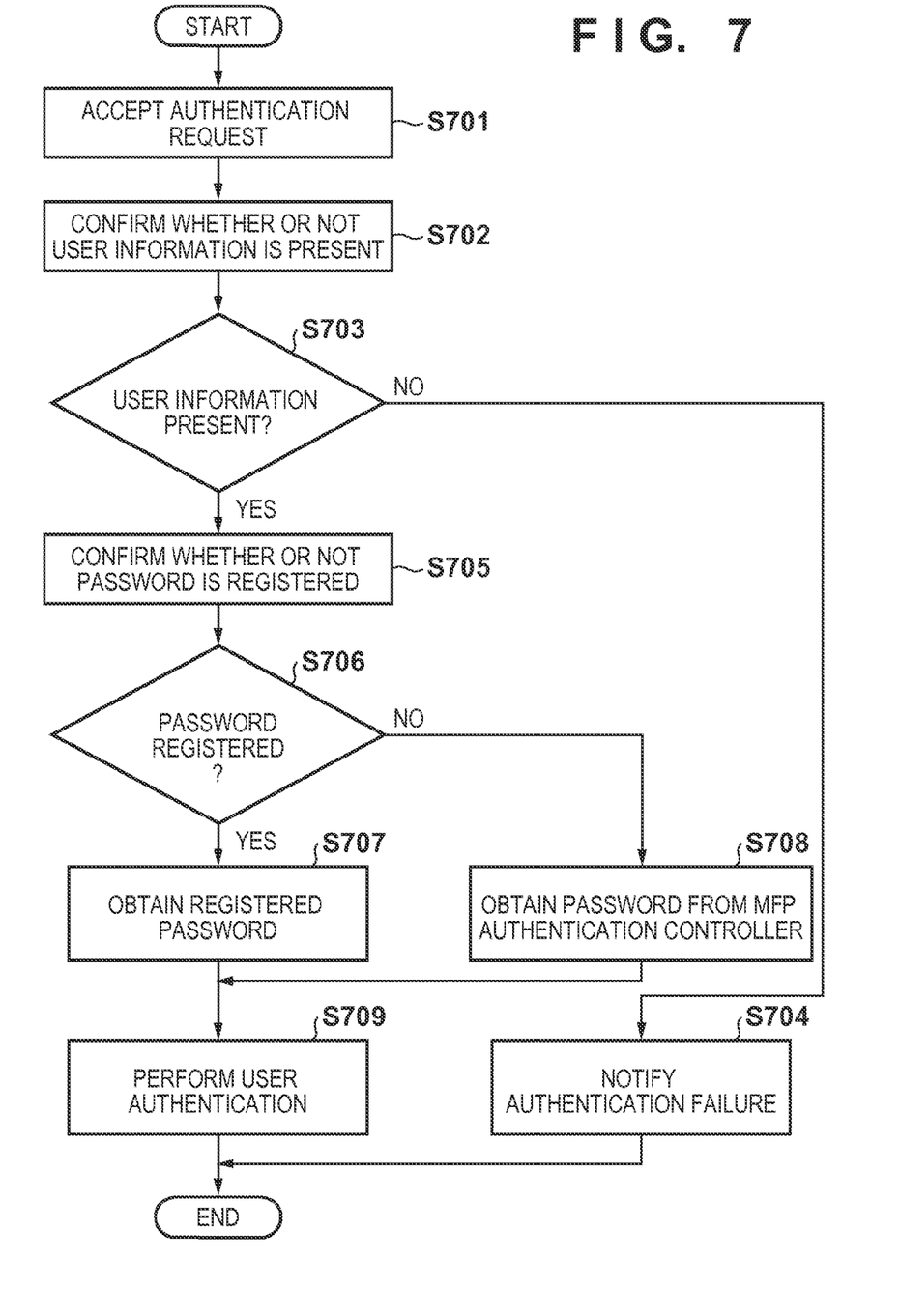
FIG. 7 is a flowchart showing user authentication of SNMPv3.

FIG. 7 is a flowchart showing a process of SNMP authentication in the MFP 101 according to this embodiment. The process of each step shown in FIG. 7 is realized in the MFP 101, by the CPU 201 reading software (software corresponding to each functional block shown in FIG. 3) stored in the ROM 202 or the HDD 204 into the RAM 203 and executing the software. The process of each step is thus executed by the CPU 201.

In S701, the user authentication unit 313 for SNMP authentication (the CPU 201) accepts, from the PC 102, access designating user authentication as the security setting according to SNMPv3. This access corresponds to an authentication request for SNMP authentication from the PC 102, and includes information indicating a user name and an authentication password of a user to be authenticated. Having accepted the authentication request for SNMP authentication from the PC 102, in S702 the user authentication unit 313 confirms whether or not user information of the user designated in the authentication request is included in the user information managed by the user information managing unit 311 for SNMP authentication. In other words, the user authentication unit 313 confirms whether or not user information corresponding to the user name included in the authentication request is present.

In the case where the user authentication unit 313 determines that the user information of the user to be authenticated is not present in S703, the user authentication unit 313 advances the process to S704. In S704, the user authentication unit 313 notifies the transmitter of the authentication request that the user authentication has failed, and ends the process.

On the other hand, in the case where the user authentication unit 313 determines that the user information of the user to be authenticated is present in S703, the user authentication unit 313 advances the process to S705. In S705, the user authentication unit 313 confirms whether or not the authentication password of the user to be authenticated is registered in the user information managed by the user information managing unit 311, using the user name included in the authentication request. In this way, the user authentication unit 313 confirms whether or not the user information (authentication password) of the user to be authenticated is managed by the user information managing unit 321 for MFP authentication. The case where the authentication password is not registered in the user information managed by the user information managing unit 311 means that the user information of the user to be authenticated is managed by the user information managing unit 321 for MFP authentication.

In the case where the user authentication unit 313 determines that the authentication password is registered in S706, the user authentication unit 313 advances the process to S707, and obtains the authentication password registered in the user information from the user information managing unit 311. The user authentication unit 313 then advances the process to S709. In the case where the user authentication unit 313 determines that the authentication password is not registered in S706, the user authentication unit 313 advances the process to S708. In S708, the user authentication unit 313 obtains the authentication password managed by the user information managing unit 321 for MFP authentication in association with the user name included in the authentication request, from the user information managing unit 321. The user authentication unit 313 then advances the process to S709.

Lastly, in S709, the user authentication unit 313 performs user authentication using the user name and the authentication password included in the authentication request. This can be done by comparing the authentication password included in the authentication request with the authentication password obtained in S707 or S708.

According to the process shown in FIG. 7, the user can use a common authentication password for SNMP authentication and MFP authentication.

As described above, according to this embodiment, when user information to be registered for SNMP authentication is input, the MFP 101 confirms whether or not user information for MFP authentication is already managed for the user to be registered who is indicated by the input user information. In the case where the user information for MFP authentication is not managed for the user to be registered, the MFP 101 registers the input user information as user information for SNMP authentication. In the case where the user information for MFP authentication is managed for the user, the MFP 101 registers information specific to SNMP authentication, i.e. information other than an authentication password, out of the input user information.

This enables, when user information for SNMP authentication and user information for MFP authentication are managed in the MFP 101, individual management of information used specifically for each authentication scheme while unifying the management of an authentication password used in common for the authentication schemes. The complexity of managing user information can be reduced in this way. Moreover, since a common authentication password is always used for SNMP authentication and MFP authentication, the user-friendliness in user authentication can be improved.

Embodiment 2

Figure 8:
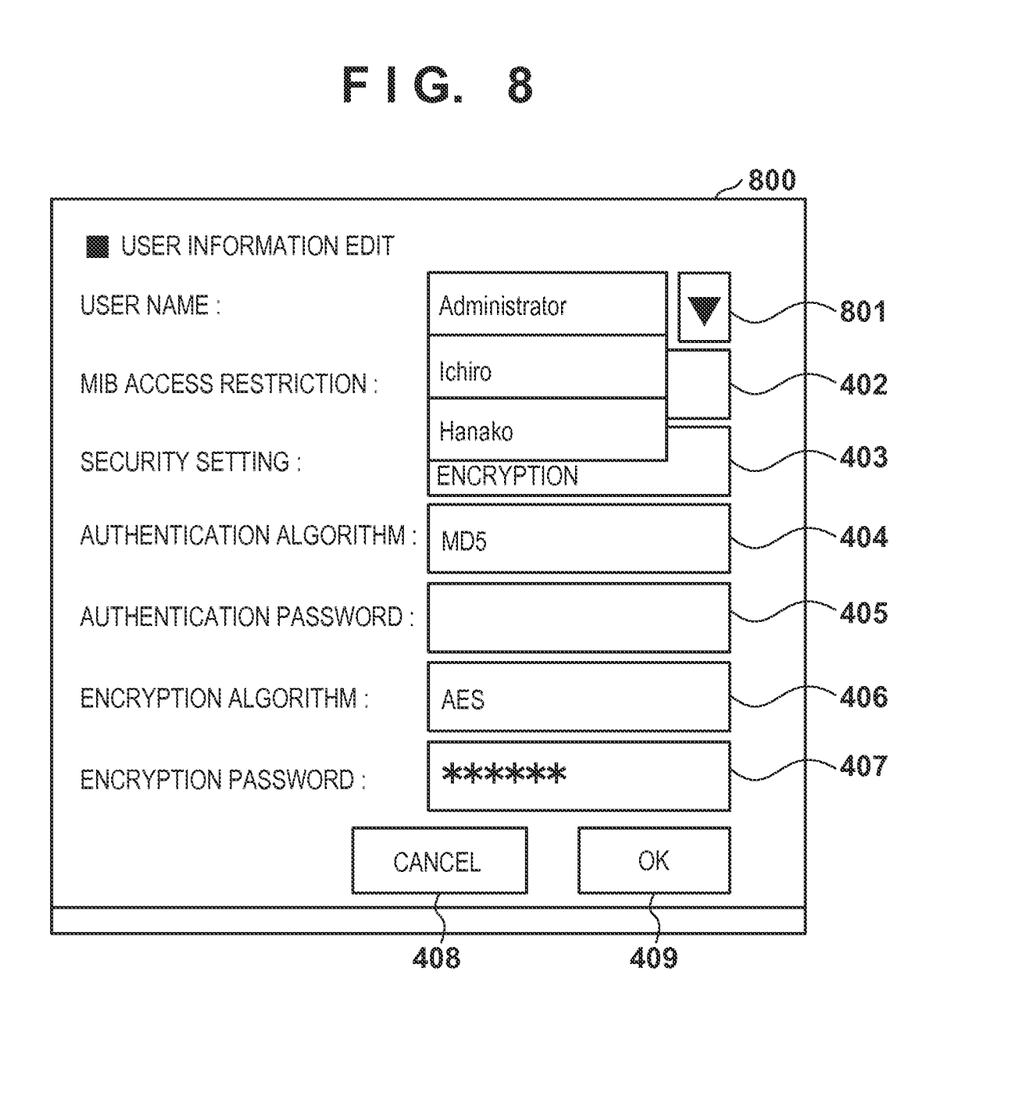
FIG. 8 is a diagram showing an example of a user edit screen of SNMPv3 according to Embodiment 2.
Figure 9:
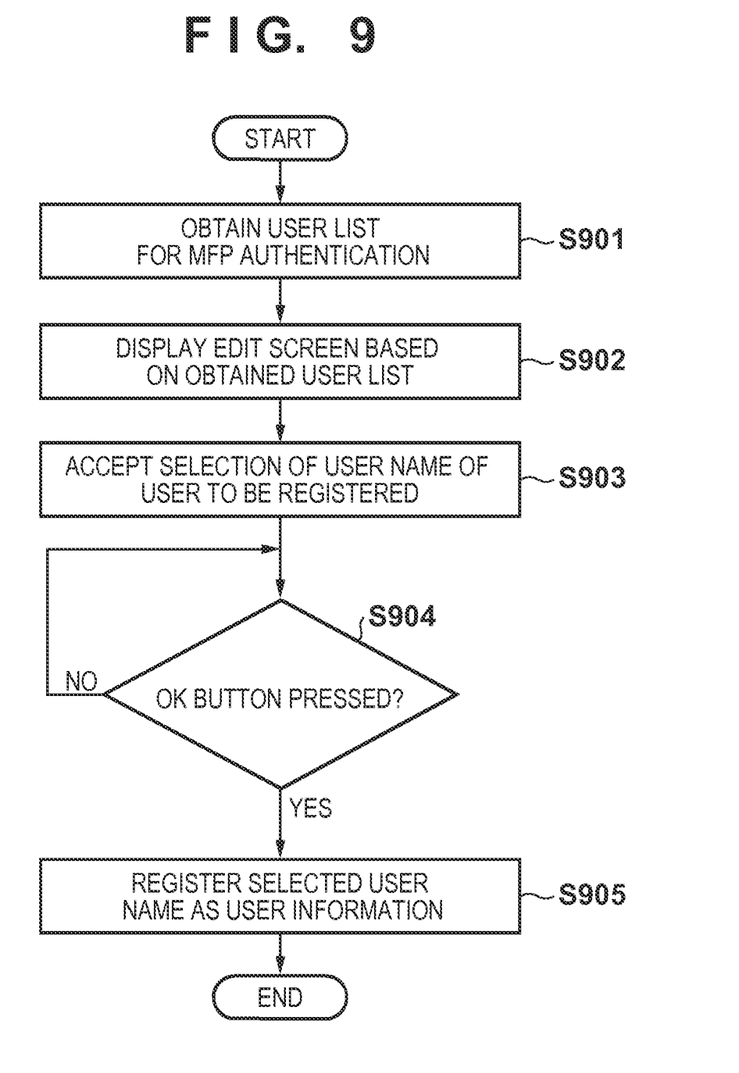
FIG. 9 is a flowchart showing user registration of SNMPv3 according to Embodiment 2.

The following describes Embodiment 2 of the present invention, with reference to FIGS. 8 and 9. In this embodiment, upon registration of user information for SNMP authentication, a list of users corresponding to user information already registered and managed for MFP authentication is obtained, and selection of a user to be registered from the obtained list is accepted.

<Process of Registering User Information For SNMP Authentication>

FIG. 9 is a flowchart showing a process of registering user information for SNMP authentication in the MFP 101 according to this embodiment. The process of each step shown in FIG. 9 is realized in the MFP 101, by the CPU 201 reading software stored in the ROM 202 or the HDD 204 into the RAM 203 and executing the software. The process of each step is thus executed by the CPU 201.

In S901, the user information editing unit 312 (the CPU 201) obtains a list of users corresponding to user information registered in the user information managing unit 321 for MFP authentication, from the user information managing unit 321 for MFP authentication. Having obtained the user list from the user information managing unit 321, in S902 the user information editing unit 312 displays an edit screen for editing user information in the operation unit 209, based on the obtained user list. In detail, the user information editing unit 312 displays an edit screen 800 shown in FIG. 8. In the edit screen 800, user names included in the obtained user list are listed as user names. The user can select any of the listed user names, by operating a button 801. In S903, the user information editing unit 312 accepts the selection of the user (user name) to be registered, from the user via the operation unit 209.

Following this, when the operation unit 209 detects that the user has pressed the OK button 409 in S904 (S904: YES), the user information editing unit 312 advances the process to S905. In S905, the user information editing unit 312 registers user information input via the edit screen 800, in the user information managing unit 311 as user information for SNMP authentication. Here, the user information editing unit 312 registers information including the selected user name in the user information managing unit 311 as user information, without registering an authentication password.

As described above, according to this embodiment, the management of authentication passwords corresponding to all user information used for SNMP authentication can be unified in the user information managing unit 321 for MFP authentication. Moreover, upon registering user information for SNMP authentication, the user can perform the registration process simply by an operation of selecting user information (user name) based on user information already registered in the MFP 101 for MFP authentication. The operability when registering user information can be improved in this way.

Embodiment 3

Figure 10:
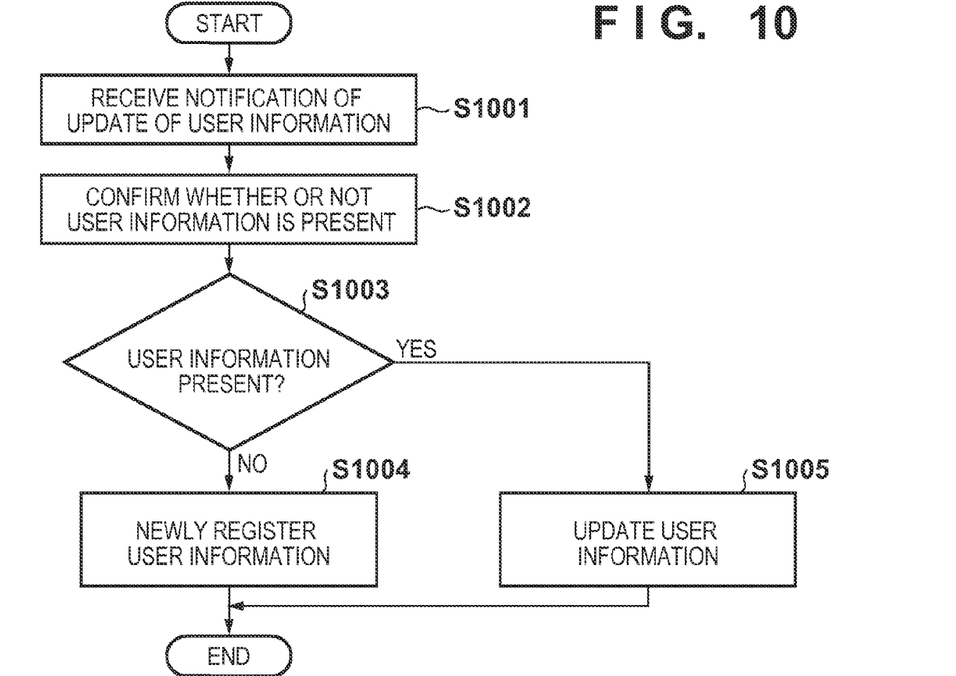
FIG. 10 is a flowchart showing user management of a user authentication function according to Embodiment 3.
Figure 11:
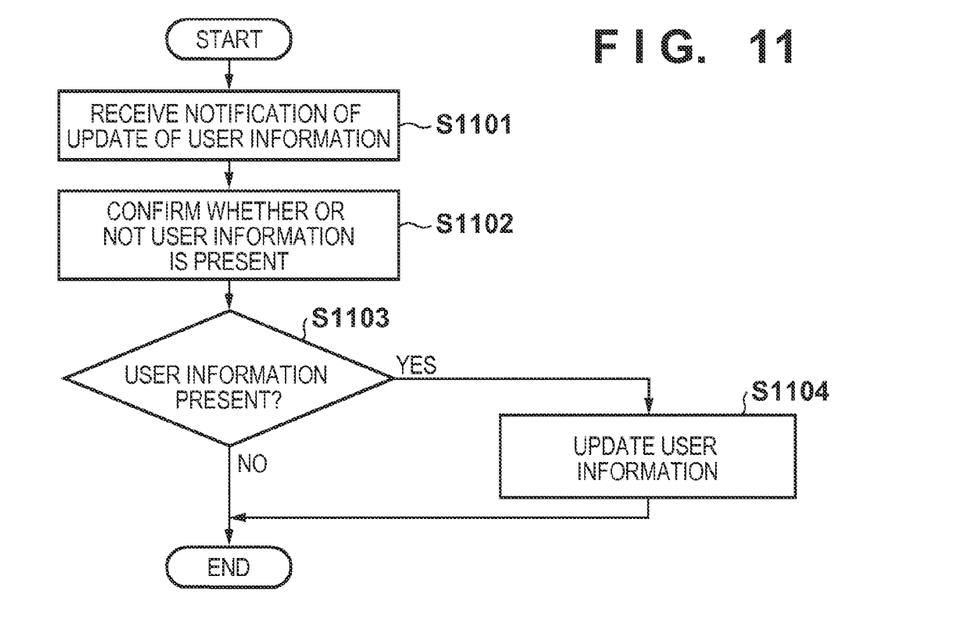
FIG. 11 is a flowchart showing user management of SNMPv3 according to Embodiment 3.

The following describes Embodiment 3 of the present invention, with reference to FIGS. 10 and 11. In this embodiment, user information managed for authentication are synchronized with each other in the case where user information for SNMP authentication is updated in the SNMP controller 303 or user information for MFP authentication is updated in the MFP authentication controller 304.

<Update of User Information for SNMP Authentication>

FIG. 10 is a flowchart showing a process of synchronization of user information from the SNMP controller 303 to the MFP authentication controller 304, which is performed when user information for SNMP authentication is updated by the user information editing unit 312. The process of each step shown in FIG. 10 is realized in the MFP 101, by the CPU 201 reading software stored in the ROM 202 or the HDD 204 into the RAM 203 and executing the software. The process of each step is thus executed by the CPU 201.

When user information (authentication password) for SNMP authentication managed by the user information managing unit 311 is updated, the user information managing unit 311 notifies the user information managing unit 321 for MFP authentication of the update of the user information. In S1001, the user information managing unit 321 receives the notification of the update of the user information from the user information managing unit 311. The notification includes the updated user information (user name and authentication password).

Following this, in S1002, the user information managing unit 321 confirms whether or not information indicating the notified user name is included in the managed user information, to confirm whether or not user information corresponding to the user name is present. In the case where the user information managing unit 321 determines that the user information is not present in S1003, the user information managing unit 321 advances the process to S1004. In S1004, the user information managing unit 321 newly registers the notified user information as user information for MFP authentication. In the case where the user information managing unit 321 determines that the user information is present in S1003, the user information managing unit 321 advances the process to S1005. In S1005, the user information managing unit 321 updates the confirmed user information with the user information (authentication password) included in the notification received from the user information managing unit 311, and ends the process.

<Update of User Information For MFP Authentication>

FIG. 11 is a flowchart showing a process of synchronization from the MFP authentication controller 304 to the SNMP controller 303, which is performed when user information for MFP authentication is updated by the user information editing unit 322. The process of each step shown in FIG. 11 is realized in the MFP 101, by the CPU 201 reading software stored in the ROM 202 or the HDD 204 into the RAM 203 and executing the software. The process of each step is thus executed by the CPU 201.

When user information (authentication password) for MFP authentication managed by the user information managing unit 321 is updated, the user information managing unit 321 notifies the user information managing unit 311 for SNMP authentication of the update of the user information. In S1101, the user information managing unit 311 receives the notification of the update of the user information from the user information managing unit 321. The notification includes the updated user information (user name and authentication password).

Following this, in S1102, the user information managing unit 311 confirms whether or not information indicating the notified user name is included in the managed user information, to confirm whether or not user information corresponding to the user name is present. In the case where the user information managing unit 311 determines that the user information is not present in S1103, the user information managing unit 311 ends the process. In the case where the user information managing unit 311 determines that the user information is present in S1103, the user information managing unit 311 advances the process to S1104. In S1104, the user information managing unit 311 updates the confirmed user information with the user information (authentication password) included in the notification received from the user information managing unit 321, and ends the process.

According to this embodiment, a password for MFP authentication and a password for SNMP authentication are synchronized automatically. This enables user authentication to be performed using the same password, while individually managing user information for MFP authentication and user information for SNMP authentication.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-214139, filed Oct. 11, 2013, which is hereby incorporated by reference herein in its entirety.

What is claimed is:

1. An information processing apparatus comprising at least one processor and at least one memory coupled to the at least one processor which act as:
   a first authentication unit and a second authentication unit configured to respectively perform user authentication by a first authentication scheme and a second authentication scheme, and each manage user information registered for user authentication;
   an input unit configured to accept input of user information to be registered for user authentication by the first authentication scheme;
   a confirmation unit configured to, when the user information is input via the input unit, confirm whether or not user information for user authentication by the second authentication scheme is managed by the second authentication unit for a user indicated by the input user information; and
   a control unit configured to control the first authentication unit to register the user information input via the input unit under at least a condition that the confirmation unit confirms that the user information for user authentication by the second authentication scheme is not managed, and to register information specific to the first authentication scheme out of the user information input via the input, but not to register at least a part of user information which is inputted or prevented from input via the input unit, under at least a condition that the confirmation unit confirms that the user information for user authentication by the second authentication scheme is managed.

2. The information processing apparatus according to claim 1,
   wherein the confirmation unit is configured to confirm, using a user name input via the input unit, whether or not the user information for user authentication by the second authentication scheme is managed by the second authentication unit, and
   the control unit is configured to further control the input unit not to accept input of information other than the information specific to the first authentication scheme, in the case where the confirmation unit confirms that the user information for user authentication by the second authentication scheme is managed.

3. The information processing apparatus according to claim 2,
   wherein the information other than the information specific to the first authentication scheme is a password for user authentication.

4. The information processing apparatus according to claim 1,
   wherein the first authentication unit is configured to, upon accepting a request for user authentication by the first authentication scheme:
   perform, in a case where user information indicating a user to be authenticated is not managed by the second authentication unit, user authentication using user information managed by the first authentication unit; and
   obtain, in a case where the user information indicating the user to be authenticated is managed by the second authentication unit, the user information from the second authentication unit, and perform user authentication using the obtained user information.

5. The information processing apparatus according to claim 4,
   wherein the first authentication unit is configured to, upon accepting the request for user authentication by the first authentication scheme, obtain a password from the second authentication unit as the user information in the case where the user information indicating the user to be authenticated is managed by the second authentication unit.

6. The information processing apparatus according to claim 1,
   wherein the input unit is configured to obtain, from the second authentication unit, a list of users corresponding to user information managed by the second authentication unit, and accept selection, made from the obtained list, of the user whose user information for user authentication by the first authentication scheme is to be registered.

7. The information processing apparatus according to claim 1,
   wherein the second authentication unit is configured to, when user information managed by the second authentication unit is updated, notify the first authentication unit of the updated user information, and
   the first authentication unit is configured to, when the updated user information is notified from the second authentication unit, update user information managed by the first authentication unit with the notified user information.

8. The information processing apparatus according to claim 1,
   wherein the first authentication unit is configured to, when user information managed by the first authentication unit is updated, notify the second authentication unit of the updated user information, and the second authentication unit is configured to, when the updated user information is notified from the first authentication unit:

update, in a case where user information corresponding to the notified user information is managed by the second authentication unit, the managed user information with the notified user information; and newly register, in a case where the user information corresponding to the notified user information is not managed by the second authentication unit, user information for user authentication by the second authentication scheme using the notified user information.

9. The information processing apparatus according to claim 1, wherein the control unit is configured to, in the case where user information corresponding to the same user is registered in both the first authentication unit and the second authentication unit, control the second authentication unit to manage user information used in common for the first authentication scheme and the second authentication scheme.

10. The information processing apparatus according to claim 9, wherein the user information used in common for the first authentication scheme and the second authentication scheme is a password.

11. The information processing apparatus according to claim 1, wherein the first authentication scheme performs user authentication according to SNMP version 3, and the second authentication scheme performs user authentication for authenticating a user who uses a function of the information processing apparatus.

12. A control method for an information processing apparatus including a first authentication unit and a second authentication unit configured to respectively perform user authentication by a first authentication scheme and a second authentication scheme and each manage user information registered for user authentication, the control method comprising:

accepting input of user information to be registered for user authentication by the first authentication scheme;

when the user information is input in the accepting, confirming whether or not user information for user authentication by the second authentication scheme is managed by the second authentication unit for a user indicated by the input user information; and controlling the first authentication unit to register the input user information under at least a condition that it is confirmed that the user information for user authentication by the second authentication scheme is not managed, and to register information specific to the first authentication scheme out of the input user information, but not to register at least a part of the user information which is inputted or prevented from input, under at least a condition that it is confirmed that the user information for user authentication by the second authentication scheme is managed.

13. A non-transitory computer-readable storage medium storing a computer program for causing a computer to execute steps of a control method for an information processing apparatus including a first authentication unit and a second authentication unit configured to respectively perform user authentication by a first authentication scheme and a second authentication scheme and each manage user information registered for user authentication, the control method comprising:

accepting input of user information to be registered for user authentication by the first authentication scheme;

when the user information is input in the accepting, confirming whether or not user information for user authentication by the second authentication scheme is managed by the second authentication unit for a user indicated by the input user information; and controlling the first authentication unit to register the input user information under at least a condition that it is confirmed that the user information for user authentication by the second authentication scheme is not managed, and to register information specific to the first authentication scheme out of the input user information, but not to register at least a part of the user information which is inputted or prevented from input, under at least a condition that it is confirmed that the user information for user authentication by the second authentication scheme is managed.

* * * * *